US012798208B2

(12) United States Patent
Le et al.

(10) Patent No.: US 12,798,208 B2
(45) Date of Patent: Nov. 17, 2026

(54) METHOD AND APPARATUS FOR AUTOMATICALLY MANUFACTURING SHOE SOLES

(71) Applicant: adidas AG, Herzogenaurach (DE)

(72) Inventors: Tru Huu Minh Le, Herzogenaurach (DE); Carsten Landeck, Herzogenaurach (DE); Christopher Edward Holmes, Herzogenaurach (DE); Angus Wardlaw, Herzogenaurach (DE); Constantin Kemmer, Herzogenaurach (DE); Victor Romanov, Herzogenaurach (DE); Christoph Dyckmans, Herzogenaurach (DE); Amir Fathi, Herzogenaurach (DE)

(73) Assignee: adidas AG, Herzogenaurach (DE)

( * ) Notice: Subject to any disclaimer, the term of this patent is extended or adjusted under 35 U.S.C. 154(b) by 315 days.

(21) Appl. No.: 18/582,565

(22) Filed: Feb. 20, 2024

(65) Prior Publication Data

US 2024/0190096 A1 Jun. 13, 2024

Related U.S. Application Data

(60) Continuation of application No. 17/397,446, filed on Aug. 9, 2021, now Pat. No. 11,938,697, which is a (Continued)

(30) Foreign Application Priority Data

May 24, 2016 (DE) ........................ 102016209045.3

(51) Int. Cl.

*B29D 35/14* (2010.01)
*A43B 13/00* (2006.01)

(Continued)

(52) U.S. Cl.

CPC ............ *B29D 35/148* (2013.01); *A43B 13/00* (2013.01); *A43B 13/04* (2013.01); *A43D 1/08* (2013.01);

(Continued)

(58) Field of Classification Search

CPC .... B29D 35/122; B29D 35/148; A43B 13/00; A43D 1/08

(Continued)

(56) References Cited

U.S. PATENT DOCUMENTS

| | | | |
|---|---|---|---|
| 1,855,098 | A | 4/1932 | Russell |
| 2,787,809 | A | 4/1957 | Stastny |

(Continued)

FOREIGN PATENT DOCUMENTS

| | | | |
|---|---|---|---|
| AT | 505333 | A1 | 12/2008 |
| CN | 1087573 | A | 6/1994 |

(Continued)

OTHER PUBLICATIONS

Office Action, European Patent Application No. 21217801.6, May 16, 2024, 5 pages.

(Continued)

*Primary Examiner* — George B Bennett
(74) *Attorney, Agent, or Firm* — Kilpatrick Townsend & Stockton LLP

(57) ABSTRACT

A method for automated manufacturing of shoe soles comprises the steps of: loading a transfer device with at least one outsole element and at least one supporting element, positioning the loaded transfer device adjacent a first part and a second part of a sole mold, transferring the at least one outsole element from the transfer device to the first part and transferring the at least one supporting element from the transfer device to the second part of the sole mold, filling the sole mold with a plurality of individual particles, and (Continued)

applying a medium to bond and/or fuse the particles with each other and with the at least one outsole element.

20 Claims, 5 Drawing Sheets

Related U.S. Application Data division of application No. 15/602,537, filed on May 23, 2017, now abandoned.

(51) Int. Cl.

| | |
|---|---|
| ***A43B 13/04*** | (2006.01) |
| ***A43D 1/08*** | (2006.01) |
| ***A43D 111/00*** | (2006.01) |
| ***A43D 117/00*** | (2006.01) |
| ***B29D 35/12*** | (2010.01) |
| *B29K 75/00* | (2006.01) |
| *B29K 105/04* | (2006.01) |

(52) U.S. Cl.
CPC ........ *A43D 111/006* (2013.01); *A43D 117/00* (2013.01); *B29D 35/122* (2013.01); *B29D 35/142* (2013.01); *A43D 2200/10* (2013.01); *B29K 2075/00* (2013.01); *B29K 2105/048* (2013.01)

(58) Field of Classification Search
USPC .................................................................. 33/6
See application file for complete search history.

(56) References Cited

U.S. PATENT DOCUMENTS 3,058,162 A 10/1962 Grabowski
3,193,876 A 7/1965 Thompson
3,315,317 A 4/1967 Winkler
3,413,682 A 12/1968 Roland
3,424,827 A 1/1969 Galizia et al.
3,464,083 A 9/1969 Adler
3,598,672 A 8/1971 Heller
3,813,201 A 5/1974 Frederick et al.
3,971,839 A 7/1976 Taylor
4,035,216 A 7/1977 Immel
4,298,324 A 11/1981 Soulier
4,441,876 A 4/1984 Marc
4,483,809 A 11/1984 Ando et al.
4,902,721 A 2/1990 Pham et al.
4,936,030 A 6/1990 Rennex
5,082,436 A 1/1992 Choi et al.
5,128,880 A * 7/1992 White .................. A61B 5/1036 600/592
5,156,754 A 10/1992 Nomura et al.
5,194,190 A 3/1993 Kim
5,237,520 A * 8/1993 White .................. A61B 5/1074 600/592
D340,797 S 11/1993 Pallera et al.
5,314,927 A 5/1994 Kondo et al.
5,343,190 A 8/1994 Rodgers
5,396,249 A 3/1995 Yamada et al.
5,503,786 A 4/1996 Yang
5,518,060 A 5/1996 Bilderback et al.
5,667,737 A 9/1997 Wittmann
D384,794 S 10/1997 Merceron
5,718,968 A 2/1998 Cutler et al.
5,736,167 A 4/1998 Chang
5,937,265 A 8/1999 Pratt et al.
6,035,554 A 3/2000 Duncan
6,042,764 A 3/2000 Eder et al.
6,086,808 A 7/2000 Sorensen et al.
6,132,663 A 10/2000 Johnson et al.
6,165,300 A 12/2000 Elsner et al.
6,253,159 B1 6/2001 Bett et al.
6,346,210 B1 2/2002 Swartz et al.
6,432,320 B1 8/2002 Bonsignore et al.
6,464,922 B1 10/2002 Bogdan
6,800,227 B1 10/2004 Nohara et al.
D549,432 S 8/2007 McClaskie
D556,989 S 12/2007 Horne et al.
D593,292 S 6/2009 McClaskie
7,854,071 B2 * 12/2010 Goonetilleke ....... A61B 5/1074 33/3 R
D709,680 S 7/2014 Herath
8,922,641 B2 12/2014 Bertin et al.
8,958,901 B2 2/2015 Regan
8,961,844 B2 2/2015 Baghdadi et al.
D728,910 S 5/2015 Hansen
D740,003 S 10/2015 Herath
D740,004 S 10/2015 Hoellmueller et al.
9,212,270 B2 12/2015 Fuessi et al.
D758,056 S 6/2016 Herath et al.
D765,362 S 9/2016 Kuerbis
D768,362 S 10/2016 Budke
9,498,927 B2 11/2016 Watkins et al.
D776,410 S 1/2017 Herath et al.
D782,169 S 3/2017 Roulo et al.
D783,264 S 4/2017 Hoellmueller et al.
9,610,746 B2 4/2017 Wardlaw et al.
D788,420 S 6/2017 Roulo et al.
9,681,709 B2 6/2017 Lott et al.
9,788,606 B2 10/2017 Reinhardt et al.
9,849,645 B2 12/2017 Wardlaw et al.
D807,622 S 1/2018 Bikowsky et al.
D809,259 S 2/2018 Remy
D811,062 S 2/2018 Teague
D814,758 S 4/2018 Truelsen
10,013,711 B2 * 7/2018 Gooch ..................... A43D 1/06
D846,256 S 4/2019 Khalife
10,259,183 B2 4/2019 Wardlaw et al.
D850,766 S 6/2019 Girard et al.
D851,889 S 6/2019 Dobson et al.
D852,475 S 7/2019 Hoellmueller
D852,476 S 7/2019 Hartmann
D853,699 S 7/2019 Coonrod et al.
10,357,904 B2 7/2019 Farris et al.
D855,297 S 8/2019 Motoki
D855,953 S 8/2019 Girard et al.
D858,051 S 9/2019 Mace
D858,960 S 9/2019 Mace
D858,961 S 9/2019 Mace
D869,833 S 12/2019 Hartmann et al.
10,506,846 B2 12/2019 Wardlaw et al.
D873,543 S 1/2020 Coonrod et al.
10,943,284 B2 * 3/2021 Gooch ............... G06Q 30/0623
10,974,476 B2 4/2021 Le et al.
11,832,688 B2 * 12/2023 Druskin ................. A43D 35/00
11,938,697 B2 * 3/2024 Le ............................ A43D 1/08
12,408,730 B1 * 9/2025 Holan .................... A43B 17/00
12,570,062 B2 * 3/2026 Hartmann ............ B29D 35/122
2001/0013459 A1 8/2001 Pattantyus-Abraham et al.
2001/0048182 A1 12/2001 Caretta et al.
2002/0025998 A1 2/2002 Mccullough et al.
2002/0170650 A1 11/2002 Chi et al.
2003/0033730 A1 2/2003 Burke et al.
2003/0232933 A1 12/2003 Lagneaux et al.
2004/0030435 A1 2/2004 Popp et al.
2004/0032042 A1 2/2004 Chi
2004/0222554 A1 11/2004 Akopyan
2004/0232583 A1 11/2004 Monsheimer et al.
2005/0110183 A1 5/2005 Buchel et al.
2005/0116372 A1 6/2005 Bruning et al.
2005/0144034 A1 6/2005 Hunter
2005/0183292 A1 8/2005 DiBenedetto et al.
2006/0043645 A1 3/2006 Goettsch et al.
2006/0279014 A1 12/2006 Balchin et al.
2007/0029698 A1 2/2007 Rynerson et al.
2008/0224357 A1 9/2008 Allmendinger et al.
2008/0277837 A1 11/2008 Liu et al.
2008/0282579 A1 11/2008 Bobbett et al.
2009/0013558 A1 1/2009 Hazenberg et al.
2009/0072436 A1 3/2009 Dean
2009/0142563 A1 6/2009 Zorn et al.

(56) References Cited

U.S. PATENT DOCUMENTS

| | | | |
|---|---|---|---|
| 2010/0239803 A1 | 9/2010 | Farkas et al. | |
| 2010/0267850 A1 | 10/2010 | Yoshida et al. | |
| 2011/0232008 A1 | 9/2011 | Crisp | |
| 2011/0266717 A1 | 11/2011 | Nehls et al. | |
| 2011/0297590 A1 | 12/2011 | Ackley et al. | |
| 2012/0056345 A1 | 3/2012 | Lee et al. | |
| 2012/0073161 A1 | 3/2012 | Doyle | |
| 2012/0186107 A1 | 7/2012 | Crary et al. | |
| 2012/0205435 A1 | 8/2012 | Woerz et al. | |
| 2013/0125319 A1 | 5/2013 | Regan | |
| 2013/0126075 A1 | 5/2013 | Jiang et al. | |
| 2013/0150468 A1 | 6/2013 | Fuessi et al. | |
| 2013/0203879 A1 | 8/2013 | Rensen et al. | |
| 2013/0266792 A1 | 10/2013 | Nohara et al. | |
| 2013/0267639 A1 | 10/2013 | Zhuang et al. | |
| 2013/0291409 A1 | 11/2013 | Reinhardt et al. | |
| 2013/0333950 A1 | 12/2013 | Atkins et al. | |
| 2014/0017450 A1 | 1/2014 | Baghdadi et al. | |
| 2014/0110491 A1 | 4/2014 | Roberts, Jr. | |
| 2014/0189964 A1 | 7/2014 | Wen et al. | |
| 2014/0223776 A1 | 8/2014 | Wardlaw et al. | |
| 2014/0223777 A1 | 8/2014 | Whiteman et al. | |
| 2014/0223783 A1 | 8/2014 | Wardlaw et al. | |
| 2014/0227505 A1 | 8/2014 | Schiller et al. | |
| 2014/0243442 A1 | 8/2014 | Coles et al. | |
| 2014/0259753 A1 | 9/2014 | Watkins et al. | |
| 2014/0275306 A1 | 9/2014 | Watkins et al. | |
| 2014/0366403 A1 | 12/2014 | Reinhardt et al. | |
| 2014/0366404 A1 | 12/2014 | Reinhardt et al. | |
| 2014/0366405 A1 | 12/2014 | Reinhardt et al. | |
| 2015/0038605 A1 | 2/2015 | Baghdadi | |
| 2015/0076236 A1 | 3/2015 | Chen | |
| 2015/0101133 A1 | 4/2015 | Manz et al. | |
| 2015/0101134 A1 | 4/2015 | Manz et al. | |
| 2015/0119482 A1 | 4/2015 | Kumar et al. | |
| 2015/0166270 A1 | 6/2015 | Buscher et al. | |
| 2015/0174808 A1 | 6/2015 | Rudolph et al. | |
| 2015/0190830 A1 | 7/2015 | Regan et al. | |
| 2015/0197617 A1 | 7/2015 | Prissok et al. | |
| 2015/0237823 A1 | 8/2015 | Schmitt et al. | |
| 2015/0344661 A1 | 12/2015 | Spies et al. | |
| 2015/0366289 A1 | 12/2015 | Rustam et al. | |
| 2016/0001476 A1 | 1/2016 | Sommer et al. | |
| 2016/0015120 A1 | 1/2016 | Denison et al. | |
| 2016/0037859 A1 | 2/2016 | Smith et al. | |
| 2016/0039162 A1 | 2/2016 | Murphy et al. | |
| 2016/0044992 A1 | 2/2016 | Reinhardt et al. | |
| 2016/0046751 A1 | 2/2016 | Spies et al. | |
| 2016/0121524 A1 | 5/2016 | Daeschlein et al. | |
| 2016/0125499 A1* | 5/2016 | Gooch | A43D 1/08 705/26.7 |
| 2016/0128426 A1 | 5/2016 | Reinhardt et al. | |
| 2016/0200011 A1 | 7/2016 | Rothfuss et al. | |
| 2016/0227876 A1 | 8/2016 | Le et al. | |
| 2016/0244583 A1 | 8/2016 | Keppeler | |
| 2016/0244584 A1 | 8/2016 | Keppeler | |
| 2016/0244587 A1 | 8/2016 | Gutmann et al. | |
| 2016/0278481 A1 | 9/2016 | Le et al. | |
| 2016/0295955 A1 | 10/2016 | Wardlaw et al. | |
| 2016/0302508 A1 | 10/2016 | Kormann et al. | |
| 2016/0311133 A1 | 10/2016 | Metaverso | |
| 2016/0311993 A1 | 10/2016 | Zhang et al. | |
| 2016/0332379 A1 | 11/2016 | Paternoster et al. | |
| 2016/0346627 A1 | 12/2016 | Le et al. | |
| 2017/0015825 A1 | 1/2017 | Ting et al. | |
| 2017/0055639 A1 | 3/2017 | Smith | |
| 2017/0173910 A1 | 6/2017 | Wardlaw et al. | |
| 2017/0253710 A1 | 9/2017 | Smith et al. | |
| 2017/0259474 A1 | 9/2017 | Holmes et al. | |
| 2017/0340067 A1 | 11/2017 | Dyckmans et al. | |
| 2017/0341325 A1 | 11/2017 | Le et al. | |
| 2017/0341326 A1 | 11/2017 | Holmes et al. | |
| 2018/0035755 A1 | 2/2018 | Reinhardt et al. | |
| 2018/0071980 A1 | 3/2018 | Lomasney et al. | |
| 2018/0103719 A1 | 4/2018 | Chen | |
| 2018/0125155 A1 | 5/2018 | Kirupanantham et al. | |
| 2018/0153254 A1 | 6/2018 | Fusco et al. | |
| 2018/0154598 A1 | 6/2018 | Kurtz et al. | |
| 2018/0206591 A1 | 7/2018 | Whiteman et al. | |
| 2018/0235310 A1 | 8/2018 | Wardlaw et al. | |
| 2018/0289098 A1 | 10/2018 | Downing et al. | |
| 2018/0290349 A1 | 10/2018 | Kirupanantham et al. | |
| 2018/0303198 A1 | 10/2018 | Reinhardt et al. | |
| 2018/0317591 A1 | 11/2018 | Hollinger et al. | |
| 2018/0332925 A1 | 11/2018 | Bailey et al. | |
| 2018/0352900 A1 | 12/2018 | Hartmann et al. | |
| 2019/0021435 A1 | 1/2019 | Kormann et al. | |
| 2019/0082789 A1 | 3/2019 | Smith et al. | |
| 2019/0231021 A1 | 8/2019 | Hoying et al. | |
| 2019/0283394 A1 | 9/2019 | Ashcroft et al. | |
| 2019/0291371 A1 | 9/2019 | Wardlaw et al. | |
| 2019/0335851 A1 | 11/2019 | Hartmann et al. | |
| 2020/0044326 A1 | 2/2020 | Olfert et al. | |
| 2020/0307041 A1 | 10/2020 | Reuber et al. | |
| 2022/0250138 A1 | 8/2022 | Moodie et al. | |
| 2023/0201912 A1 | 6/2023 | Pedmo et al. | |
| 2023/0248110 A1* | 8/2023 | Levine | B33Y 80/00 36/43 |
| 2024/0075658 A1 | 3/2024 | Siltamaeki et al. | |
| 2024/0336756 A1 | 10/2024 | Anttila et al. | |
| 2024/0389886 A1* | 11/2024 | Maresca | A61B 5/7264 |

FOREIGN PATENT DOCUMENTS

| | | | |
|---|---|---|---|
| CN | 2501679 | Y | 7/2002 |
| CN | 101060963 | A | 10/2007 |
| CN | 101611082 | A | 12/2009 |
| CN | 202895563 | U | 4/2013 |
| CN | 103507208 | A | 1/2014 |
| CN | 103978620 | A | 8/2014 |
| CN | 104302456 | A | 1/2015 |
| CN | 105209233 | A | 12/2015 |
| CN | 205021904 | U | 2/2016 |
| CN | 105520278 | A | 4/2016 |
| CN | 205291380 | A | 6/2016 |
| CN | 108472843 | A | 8/2018 |
| CN | 109318487 | A | 2/2019 |
| CN | 110831733 | A | 2/2020 |
| DE | 1704502 | A1 | 5/1971 |
| DE | 1729011 | A1 | 6/1971 |
| DE | 3032246 | A1 | 4/1982 |
| DE | 3229762 | A1 | 2/1983 |
| DE | 3437786 | A1 | 4/1986 |
| DE | 29520911 | U1 | 6/1996 |
| DE | 19633467 | A1 | 2/1998 |
| DE | 19648804 | A1 | 5/1998 |
| DE | 19654860 | A1 | 5/1998 |
| DE | 19704700 | | 9/1998 |
| DE | 19860611 | C1 | 3/2000 |
| DE | 10117979 | A1 | 8/2002 |
| DE | 202004003679 | U1 | 5/2004 |
| DE | 102004049060 | A1 | 6/2005 |
| DE | 102004028462 | | 12/2005 |
| DE | 202006009569 | U1 | 8/2006 |
| DE | 202007006164 | U1 | 9/2007 |
| DE | 102006024940 | A1 | 12/2007 |
| DE | 102007054723 | | 5/2009 |
| DE | 102009030678 | | 4/2010 |
| DE | 102009004386 | A1 | 7/2010 |
| DE | 202011109598 | U1 | 2/2012 |
| DE | 102011108744 | | 1/2013 |
| DE | 102013012515 | A1 | 3/2014 |
| DE | 102013002519 | | 8/2014 |
| DE | 102013108053 | | 1/2015 |
| DE | 102013221018 | | 4/2015 |
| DE | 102013221020 | | 4/2015 |
| DE | 102014107847 | | 12/2015 |
| DE | 102014216992 | A1 | 3/2016 |
| DE | 102015202013 | A1 | 8/2016 |
| DE | 102015202014 | | 8/2016 |
| DE | 102015224885 | | 6/2017 |
| DE | 102020110352 | A1 | 10/2020 |
| EP | 0455835 | A1 | 11/1991 |
| EP | 0578272 | A1 | 1/1994 |

(56) References Cited

FOREIGN PATENT DOCUMENTS

| | | | |
|---|---|---|---|
| EP | 0790010 | A1 | 8/1997 |
| EP | 0792593 | A2 | 9/1997 |
| EP | 0976518 | A2 | 2/2000 |
| EP | 1016354 | A1 | 7/2000 |
| EP | 1259365 | A1 | 11/2002 |
| EP | 1535714 | A2 | 6/2005 |
| EP | 1990170 | A2 | 11/2008 |
| EP | 2564719 | | 3/2013 |
| EP | 2649896 | | 10/2013 |
| EP | 2684665 | | 1/2014 |
| EP | 2764972 | A1 | 8/2014 |
| EP | 2767181 | | 8/2014 |
| EP | 2786670 | | 10/2014 |
| EP | 2845504 | | 3/2015 |
| EP | 2862467 | A1 | 4/2015 |
| EP | 2865289 | A1 | 4/2015 |
| EP | 2984956 | | 2/2016 |
| EP | 3053732 | A1 | 8/2016 |
| EP | 2649896 | A2 | 10/2016 |
| EP | 3114954 | A1 | 1/2017 |
| EP | 2767183 | | 4/2017 |
| EP | 3488723 | A1 | 5/2019 |
| GB | 1063353 | | 3/1967 |
| GB | 1248314 | A | 9/1971 |
| GB | 1275095 | | 5/1972 |
| GB | 1417522 | A | 12/1975 |
| GB | 1439101 | | 6/1976 |
| JP | S48-045560 | | 6/1973 |
| JP | S48-042216 | | 12/1973 |
| JP | S49-020266 | | 5/1974 |
| JP | S50-155569 | | 12/1975 |
| JP | 54114354 | | 9/1979 |
| JP | 55129004 | | 10/1980 |
| JP | 5620402 | | 2/1981 |
| JP | S57-005009 | | 1/1982 |
| JP | H57-180653 | | 11/1982 |
| JP | H58-021304 | | 2/1983 |
| JP | S58-142828 | | 8/1983 |
| JP | S60-500491 | | 4/1985 |
| JP | 6141402 | | 2/1986 |
| JP | 5677122 | A | 4/1988 |
| JP | S63-74629 | | 4/1988 |
| JP | H07-059368 | B2 | 3/1991 |
| JP | 6046483 | | 6/1994 |
| JP | H06-218830 | A | 8/1994 |
| JP | H06-305039 | A | 11/1994 |
| JP | H07-186151 | A | 7/1995 |
| JP | H08-052761 | A | 2/1996 |
| JP | H08-131209 | | 5/1996 |
| JP | H08-239570 | | 9/1996 |
| JP | 3047622 | | 9/1997 |
| JP | H09-322803 | | 12/1997 |
| JP | H10-058475 | A | 3/1998 |
| JP | H10-138252 | A | 5/1998 |
| JP | H11129275 | | 5/1999 |
| JP | 11-291275 | | 10/1999 |
| JP | 2000-037208 | | 2/2000 |
| JP | 2000-190394 | | 7/2000 |
| JP | 2000-279205 | | 10/2000 |
| JP | 2002-119302 | | 4/2002 |
| JP | 2002-144366 | | 5/2002 |
| JP | 2003135105 | | 5/2003 |
| JP | 2003-310302 | | 11/2003 |
| JP | 2003-311800 | A | 11/2003 |
| JP | 2006-137032 | | 6/2006 |
| JP | 2007504977 | | 3/2007 |
| JP | 2008-544009 | | 12/2008 |
| JP | 2009-518495 | | 5/2009 |
| JP | 2012-504024 | A | 2/2012 |
| JP | 2014158708 | | 9/2014 |
| JP | 2014-531352 | | 11/2014 |
| KR | 950016606 | | 7/1995 |
| KR | 20100032561 | A | 3/2010 |
| KR | 20160037252 | A | 4/2016 |
| WO | 1994/20568 | A1 | 9/1994 |
| WO | 1999/55186 | A1 | 11/1999 |
| WO | 2001/64414 | A1 | 9/2001 |
| WO | 2002/004188 | A1 | 1/2002 |
| WO | 2005/026243 | A1 | 3/2005 |
| WO | 2005066250 | | 7/2005 |
| WO | 2007082838 | | 7/2007 |
| WO | 2008087078 | | 7/2008 |
| WO | 2009036240 | | 3/2009 |
| WO | 2011/125540 | A1 | 10/2011 |
| WO | 2011/134996 | A1 | 11/2011 |
| WO | 2012065926 | | 5/2012 |
| WO | 2014/046940 | A1 | 3/2014 |
| WO | 2014/150122 | A2 | 9/2014 |
| WO | 2015-052265 | A1 | 4/2015 |
| WO | 2015-052267 | A1 | 4/2015 |
| WO | 2015-075546 | A1 | 5/2015 |
| WO | 2016/023067 | A1 | 2/2016 |
| WO | 2016/030026 | A1 | 3/2016 |
| WO | 2016/030333 | A1 | 3/2016 |

OTHER PUBLICATIONS

Office Action, European Patent Application No. 21217801.6, Sep. 18, 2023, 4 pages.
Office Action, European Patent Application No. 21217801.6, Feb. 23, 2023, 5 pages.
"New Concept of Green", Zhongguancun Promotion Center for International Environmental Protection Industry et al., Beijing, 2004, 8 pages.
Sun, "From Cardiac Electricity Vector to Cardiac Electromagnetic", Tianjin Science and Technology Press, Aug. 2013, p. 250.
Ma et al., "Modern Engineering Materials Handbook", National Defense Industry Press, May 2005, p. 953-954.
Guangchuan, "New Technology in Food Industry and Application Thereof", China Light Industry Press, Oct. 31, 1995, p. 16.
Shaoxun, "Sports Shoes Design", China Light Industry Press, Jan. 2007, p. 82.
Yang, "Sports Shoes Design Materials", China Fortune Press, Aug. 2014, pp. 57-58.
Extended European Search Report, European Patent Application No. 21217801.6, May 10, 2022, 9 pages.
Dieter , "Materials Selection and Design", ASM Handbook, vol. 20, Available Online at: https://app.knovel.com/hotlink/toc/id:kpASMHVMS2/asm-handbook-volume-20/asm-handbook-volume-20, 1997.
Office Action, European Patent Application No. 17726249.0, Nov. 15, 2019, 6 pages.
Office Action, German Patent Application No. 102016209045.3, May 13, 2019, 12 pages.
Office Action, Japanese Patent Application No. 2018-561556, Jan. 28, 2020, 5 pages.
"Plastic", Britannica Online Encyclopedia, Available Online at: https://www.britannica.com/print/article/463684, Accessed from Internet on Aug. 17, 2016, 15 pages.
U.S. Appl. No. 29/664,097, filed Sep. 21, 2018.
U.S. Appl. No. 16/680,852, filed Nov. 12, 2019.
U.S. Appl. No. 29/663,342, filed Sep. 13, 2018.
U.S. Appl. No. 29/691,166, Filed May 14, 2019.
U.S. Appl. No. 29/643,233, filed Apr. 5, 2018.
U.S. Appl. No. 29/641,371, filed Mar. 21, 2018.
U.S. Appl. No. 29/663,029, filed Sep. 11, 2018.
U.S. Appl. No. 29/641,256, filed Mar. 20, 2018.
U.S. Appl. No. 29/641,223, filed Mar. 20, 2018.
U.S. Appl. No. 29/697,489, filed Jul. 9, 2019.
U.S. Appl. No. 29/691,854, filed May 20, 2019.
U.S. Appl. No. 29/694,634, filed Jun. 12, 2019.
U.S. Appl. No. 29/719,889, filed Jan. 8, 2020.
U.S. Appl. No. 29/679,962, filed Feb. 12, 2019.
U.S. Appl. No. 29/693,455, filed Jun. 3, 2019.
U.S. Appl. No. 16/465,485, filed May 30, 2019.
U.S. Appl. No. 29/706,274, filed Sep. 19, 2019.
U.S. Appl. No. 29/721,029, filed Jan. 17, 2020.
Unpublished U.S. Appl. No. 15/581,112, filed Apr. 28, 2017. In accordance with the Waiver of the Copy Requirements in 37 CFR

(56) References Cited

OTHER PUBLICATIONS 1.98 for Cited Pending U.S. Patent Applications, 1287 O.G. 163 (Oct. 19, 2004), a copy of the cited, unpublished US Patent Application is available in the IFW and, therefore, not provided.
Unpublished U.S. Appl. No. 15/595,291, filed May 15, 2017. In accordance with the Waiver of Requirements in 37 CFR 1.98 for Cited Pending U.S. Patent Applications, 1287 O.G. 163 (Oct. 19, 2004), a copy of the cited, unpublished US Patent Application is available in the IFW and, therefore, not provided.
Unpublished U.S. Appl. No. 29/591,016, filed Jan. 16, 2017. In accordance with the Waiver of Requirements in 37 CFR 1.98 for Cited Pending U.S. Patent Applications, 1287 O.G. 163 (Oct. 19, 2004), a copy of the cited, unpublished US Patent Application is available in the IFW and, therefore, not provided.
Unpublished U.S. Appl. No. 29/592,935, filed Feb. 3, 2017. In accordance with the Waiver of Requirements in 37 CFR 1.98 for Cited Pending U.S. Patent Applications, 1287 O.G. 163 (Oct. 19, 2004), a copy of the cited, unpublished US Patent Application is available in the IFW and, therefore, not provided.
Unpublished U.S. Appl. No. 29/592,946, filed Feb. 3, 2017. In accordance with the Waiver of Requirements in 37 CFR 1.98 for Cited Pending U.S. Patent Applications, 1287 O.G. 163 (Oct. 19, 2004), a copy of the cited, unpublished US Patent Application is available in the IFW and, therefore, not provided.
Unpublished U.S. Appl. No. 29/594,228, filed Feb. 16, 2017. In accordance with the Waiver of Requirements in 37 CFR 1.98 for Cited Pending U.S. Patent Applications, 1287 O.G. 163 (Oct. 19, 2004), a copy of the cited, unpublished US Patent Application is available in the IFW and, therefore, not provided.
Unpublished U.S. Appl. No. 29/594,358 , filed Feb. 17, 2017. In accordance with the Waiver of Requirements in 37 CFR 1.98 for Cited Pending U.S. Patent Applications, 1287 O.G. 163 (Oct. 19, 2004), a copy of the cited, unpublished US Patent Application is available in the IFW and, therefore, not provided.
Unpublished U.S. Appl. No. 29/595,852 , Unpublished (filed Mar. 2, 2017). In accordance with the Waiver of Requirements in 37 CFR 1.98 for Cited Pending U.S. Patent Applications, 1287 O.G. 163 (Oct. 19, 2004), a copy of the cited, unpublished US Patent Application is available in the IFW and, therefore, not provided.
Unpublished U.S. Appl. No. 29/595,857, filed Mar. 2, 2017. In accordance with the Waiver of Requirements in 37 CFR 1.98 for Cited Pending U.S. Patent Applications, 1287 O.G. 163 (Oct. 19, 2004), a copy of the cited, unpublished US Patent Application is available in the IFW and, therefore, not provided.
Unpublished U.S. Appl. No. 29/595,859, filed Mar. 2, 2017. In accordance with the Waiver of Requirements in 37 CFR 1.98 for Cited Pending U.S. Patent Applications, 1287 O.G. 163 (Oct. 19, 2004), a copy of the cited, unpublished US Patent Application is available in the IFW and, therefore, not provided.
Unpublished U.S. Appl. No. 62/137,139, filed Mar. 23, 2016. In accordance with the Waiver of Requirements in 37 CFR 1.98 for Cited Pending U.S. Patent Applications, 1287 O.G. 163 (Oct. 19, 2004), a copy of the cited, unpublished US Patent Application is available in the IFW and, therefore, not provided.
German Patent Application No. DE102016209045.3, Office Action, mailed May 24, 2016, 6 pages (No. English translation available). A summary of the Office Action is provided in the Transmittal Letter submitted herewith).
International Patent Application No. PCT/EP2017/062407, International Search Report and Written Opinion mailed Sep. 1, 2017, 11 pages.
Office Action, Chinese Patent Application No. 201780031941.3, May 29, 2020, 16 pages.
U.S. Appl. No. 15/602,537, Restriction Requirement, Aug. 16, 2019, 7 pages.
U.S. Appl. No. 15/602,537, Non-Final Office Action, Nov. 29, 2019, 8 pages.
U.S. Appl. No. 15/602,537, Final Office Action, Jun. 2, 2020, 8 pages.
U.S. Appl. No. 15/602,537, Advisory Action, Aug. 17, 2020, 4 pages.
U.S. Appl. No. 15/602,537, Non-Final Office Action, Oct. 5, 2020, 7 pages.
U.S. Appl. No. 15/602,537, Final Office Action, Dec. 4, 2020, 7 pages.
U.S. Appl. No. 15/602,537, Advisory Action, Jan. 28, 2021, 4 pages.
U.S. Appl. No. 15/602,537, Non-Final Office Action, Mar. 17, 2021, 8 pages.
U.S. Appl. No. 15/602,537, Final Office Action, Jul. 1, 2021, 8 pages.
Office Action, Vietnamese Patent Application No. 1-2018-05591, Oct. 25, 2021, 4 pages.
*U.S. Appl. No. 17/397,446, Non-Final Office Action, Apr. 19, 2023, 11 pages.
*U.S. Appl. No. 17/397,446, Final Office Action, Jul. 27, 2023, 9 pages.
*U.S. Appl. No. 17/397,446, Notice of Allowance, Nov. 11, 2023, 9 pages.
Epoxy Resin, Wikipedia, Admitted Prior Art as of Mar. 13, 2025, 29 pages.
Material Data Sheet—Pet, Admitted Prior Art as of Mar. 13, 2025, 2 pages.
Material Data Sheet—Pom, Admitted Prior Art as of Mar. 13, 2025, 2 pages.
European Patent Application No. 25161881.5, European Extended Search Report, Apr. 22, 2025, 11 pages.
"Fiberglass Plug and Mold Making", Fiberglass Supply, Available Online at: https://fiberglasssupply.com/fiberglass-plug-and-mold-making/, 2020, 5 pages.

* cited by examiner

METHOD AND APPARATUS FOR AUTOMATICALLY MANUFACTURING SHOE SOLES

CROSS REFERENCE TO RELATED APPLICATION

This application is a continuation of U.S. patent application Ser. No. 17/397,446, filed Aug. 9, 2021 and entitled "METHOD AND APPARATUS FOR AUTOMATICALLY MANUFACTURING SHOE SOLES ("the '446 application"), which claims priority to U.S. patent application Ser. No. 15/602,537, filed May 23, 2017 and entitled METHOD AND APPARATUS FOR AUTOMATICALLY MANUFACTURING SHOE SOLES ("the '537 application") which is related to and claims priority benefits from German Patent Application No. DE 10 2016 209 045.3, filed on May 24, 2016 and entitled METHOD AND APPARATUS FOR AUTOMATICALLY MANUFACTURING SHOE SOLES ("the '045 application"). The '446, '537 and '045 applications are hereby incorporated herein in their entireties by this reference.

FIELD OF THE INVENTION

The present invention relates to a method and an apparatus for automatically manufacturing shoe soles. Moreover, the present invention relates to shoe soles and shoes manufactured by such methods and apparatuses.

BACKGROUND

The conventional manufacture of shoe soles, in particular for sport shoes, generally involves processing various plastic components. However, the processing of plastic materials, for example by injection molding, may be harmful for the environment and dangerous for workers due to an extensive use of solvents and/or adhesives in a number of production steps.

One option to avoid or at least reduce the use of such dangerous substances is to provide shoe soles from particles that can be molded together by applying steam. Various methods for manufacturing a shoe sole from such particles are known, for example from EP 2 649 896 A2, WO 2005/066250 A1, WO 2012/065926 A1, DE 10 2011 108 744 A1, and EP 2 984 956 A1. Further prior art in this regard is disclosed in EP 2 767 181 A1, WO 2007/082838 A1 WO 2008/087078 A1.

However, a common disadvantage of these production methods is that they are still very complicated and labor intensive.

To overcome these disadvantages applicant has disclosed in EP 2 786 670 A1 a method for manufacturing a part of a shoe sole from particles, wherein the individual steps of the method are carried out at various processing stations of an automated production facility. While the disclosed facility somewhat improves the productivity of the automated manufacture of a shoe sole, the large number of automated manufacturing steps is still costly and difficult to implement.

Therefore, the underlying problem of the present invention is to provide improved methods and apparatuses for the automated manufacture of shoe soles from particles in order to at least partly overcome the above mentioned deficiencies of the prior art.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain embodiments, a method comprises loading a transfer device with at least one outsole element and at least one supporting element, positioning the loaded transfer device adjacent or even between a first part and a second part of a sole mold, transferring the at least one outsole element from the transfer device to the first part and transferring the at least one supporting element from the transfer device to the second part of the sole mold, filling the sole mold with a plurality of individual particles, and applying a medium to bond and/or fuse the particles with each other and with the at least one outsole element.

In some embodiments, loading the transfer device may comprise attaching the at least one outsole element to a first side of a transfer device, rotating the transfer device, and attaching the at least one supporting element to a second side of the transfer device opposite to the first side.

In various embodiments, the attaching steps comprise suctioning the at least one outsole element and/or the at least one supporting element.

According to some embodiments, transferring the at least one outsole element may comprise placing the at least one outsole element into at least one correspondingly shaped recess provided in the first part of the mold. Transferring the at least one supporting element may further comprise placing the at least one supporting element in a holding element provided in the second part of the mold.

In certain embodiments, the method further comprises ejecting the molded shoe sole from the mold by means of ejecting devices integrated into the holding element for the supporting element. The ejecting means may support an automation of the molding process, and the manufactured sole may be automatically ejected after molding for further processing.

In various embodiments, the first part and/or the second part may be moved to close the mold prior to filling the sole mold with a plurality of individual particles. In some embodiments, after providing the at least one outsole element and the at least one supporting element, the first and the second part of the sole mold may jointly form a closed mold into which the individual particles can be filled.

The method may further comprise cooling the first part of sole mold when and/or after applying the medium.

According to some embodiments, the method may further comprise removing the formed shoe soles and curing the formed shoe soles under the influence of heat.

In various embodiments, the medium for curing the formed shoe soles comprises steam.

According to certain embodiments, an apparatus for automatically manufacturing shoe soles is provided. In some embodiments, the apparatus comprises a transfer device adapted to be loaded with at least one outsole element and at least one supporting element, a robotic device adapted to position the loaded transfer device adjacent or even between a first part and a second part of a sole mold, wherein the robotic device is further adapted to transfer the at least one outsole element from the transfer device to the first part and to transfer the at least one supporting element from the transfer device to the second part of the sole mold, a particle supply adapted to fill the sole mold with a plurality of individual particles and a medium supply, the medium being adapted to bond and/or fuse the particles with each other and with the at least one outsole element.

In various embodiments, the apparatus comprises a first and a second part of the sole mold, wherein the two parts are movable by means of at least one linear guiding rod. Such an embodiment provides a very reliably and simply way for closing the two parts of the sole mold. Moreover, a linear closing movement of the two parts may be performed with comparatively high speed.

In some embodiments, a shoe sole manufactured by one of the above summarized methods and/or apparatuses and a shoe comprising such a sole are provided.

BRIEF DESCRIPTION OF THE DRAWINGS

Possible embodiments of the present invention are further described in the following detailed description, with reference to the following figures.

BRIEF DESCRIPTION

Figure 1:
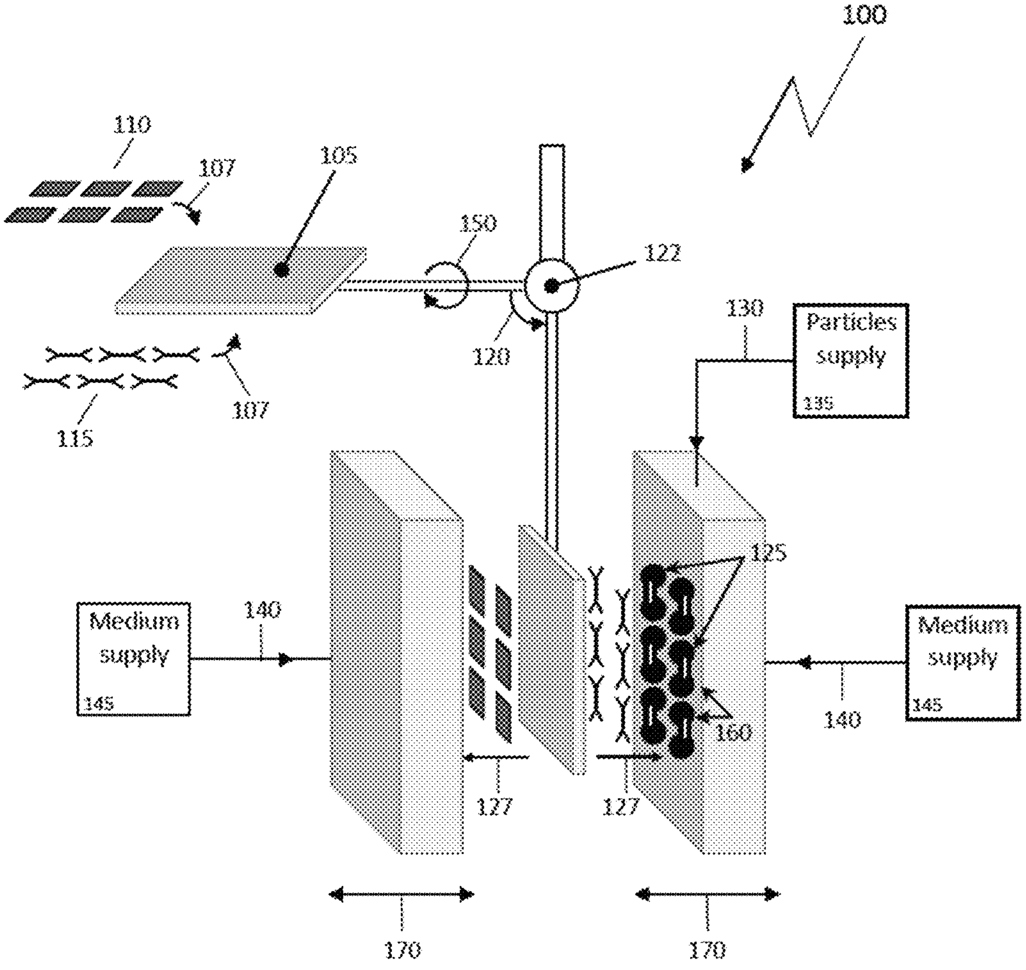
FIG. 1 is a schematic view of an apparatus for the automated manufacturing of shoe soles according to aspects of the present disclosure.

The above-mentioned problem is at least partly solved by a method and an apparatus according to the independent claims. In one embodiment, the method comprises the steps of (a) loading a transfer device with at least one outsole element and at least one supporting element, (b) positioning the loaded transfer device adjacent or even between a first part and a second part of a sole mold, (c) transferring the at least one outsole element from the transfer device to the first part and transferring the at least one supporting element from the transfer device to the second part of the sole mold, (d) filling the sole mold with a plurality of individual particles and (e) applying a medium to bond and/or fuse the particles with each other and with the at least one outsole element.

The claimed invention provides for the first time a highly efficient and automated method for the manufacture of shoe soles from particles. The positioning of the loaded transfer device with the two key elements for the final sole, namely the at least one outsole element and the at least one supporting element, adjacent the first part and the second part of a sole mold significantly simplifies the overall manufacture. In contrast to the prior art, the two elements no longer need to be manually arranged in the mold for the shoe sole. Also, there is no need for a plurality of automated production stations for the two elements. Moreover, the two elements can be automatically integrated and/or joined to the molded particle sole when in the final step (e) the medium, such as steam, is applied. Again, only a single production step is needed, which replaces an individual attachment of the outsole and/or the integration of the support element in manufacturing methods of the prior art. As a result, the overall cycle time and the labor costs are significantly reduced.

The step of loading the transfer device may comprise the steps of attaching the at least one outsole element to a first side of a transfer device, rotating the transfer device and attaching the at least one supporting element to a second side of the transfer device opposite to the first side.

Such an attachment of the two elements may further simplify their supply to the first and second part of the mold, in particular, if the transfer device is positioned between the first and the second part of the mold. Moreover, the footprint of the apparatus performing the described method may be reduced as the positioning of both, the outsole element and the support element can be jointly performed by a single transfer device.

In one embodiment, the attaching steps comprise suctioning the at least one outsole element and/or the at least one supporting element. In contrast to a mechanical attachment, a suctioning operation can be largely independent of the variances in product manufacturing tolerances of the individual item and additionally, in the context of shoe manufacture, the difference in dimensions due to the requirement for a range of different shoe sizes. This advantage facilitates the automated production of shoe soles.

In addition, a suctioning operation has the added advantage of improved attachment of flexible components, for example, a shoe outsole particularly when transferring flexible components into an accurately manufactured item, for example, a shoe mold. This advantage further facilitates the automated production of shoe soles, in particular, of shoe soles with different sizes.

The step of transferring the at least one outsole element may comprise placing the at least one outsole element into at least one correspondingly shaped recess provided in the first part of the mold. Moreover, the step of transferring the at least one supporting element may further comprise placing the at least one supporting element in a holding element provided in the second part of the mold.

The recess and the holding element allow to securely position the two elements for the subsequent molding cycle. As a result, the steps of (d) filling the mold and (e) applying the medium to bond and/or fuse the particles with each other and with the at least one outsole element lead to a shoe sole with a correctly attached outsole element and a correctly integrated support element, without any adhesives having to be involved.

In one embodiment, the method further comprises the step of ejecting the molded shoe sole from the mold by means of ejecting devices integrated into the holding element for the supporting element. The ejecting means may support an automation of the molding process, as the manufactured sole may be automatically ejected after molding for further processing. The integration of the ejecting means into the holding element assures that there is apart from the holding element no further interference with the particles in the sole mold. In addition, no further robotic device is needed in this embodiment to remove the sole from the mold.

The first part and/or the second part may be moved to close the mold prior to the step of filling the sole mold with a plurality of individual particles. Accordingly, after providing the at least one outsole element and the at least one supporting element, the first and the second part of the sole mold may jointly form a closed mold into which the individual particles can be filled. Any loss of particles is therefore reliably avoided. Also the medium used to bond/fuse the particles may not escape, when being applied to the particles.

The method may further comprise the step of cooling the first part of sole mold when and/or after applying the medium.

The inventors have found that the step of bonding and/or fusing the particles with each other and to the at least one outsole element may require elevated temperatures, for example by using hot steam as a medium. However, if the at least one outsole element is subjected to higher temperatures it may start to deform or even melt, so that fine structures of for example the profile of the outsole element may be distorted or even fully lost. This problem can be avoided or at least reduced by cooling the first part of the sole in which the at least one outsole element is placed. Moreover, the cooling may allow to further shorten the overall cycle time so that in the end an even more efficient production of shoe soles may be achieved.

The method may further comprise the steps of removing the formed shoe soles and curing the formed shoe soles under the influence of heat. The curing may be provided outside the mold, which is advantageous as the time for curing may take significantly longer than the time for molding the shoe soles. A new molding cycle can therefore start long before the curing step is finished.

In one embodiment, the medium comprises steam. Advantageously, steam is not expensive, relatively easy to handle and provides the necessary temperature for the bonding and/or fusing process of certain types of particles among each other and with the outsole and/or the support element.

A further aspect of the invention is directed to an apparatus for automatically manufacturing shoe soles. In one embodiment, the apparatus comprises a transfer device adapted to be loaded with at least one outsole element and at least one supporting element, a robotic device adapted to position the loaded transfer device adjacent or even between a first part and a second part of a sole mold, wherein the robotic device is further adapted to transfer the at least one outsole element from the transfer device to the first part and to transfer the at least one supporting element from the transfer device to the second part of the sole mold, a particle supply adapted to fill the sole mold with a plurality of individual particles and a medium supply, the medium being adapted to bond and/or fuse the particles with each other and with the at least one outsole element.

In one embodiment, the apparatus comprises a first and a second part of the sole mold, wherein the two parts are movable by means of at least one linear guiding rod. Such an embodiment provides a very reliably and simply way for closing the two parts of the sole mold. Moreover, a linear closing movement of the two parts may be performed with comparatively high speed as the at least one guiding rod provides a high amount of directional stability. Again, the overall result is a reduction in cycle time as well as a minimum risk of operational problems during the automated manufacturing of shoe soles.

Finally, according to another aspect the present invention is directed to a shoe sole manufactured by one of the above summarized methods and/or apparatuses and to a shoe comprising such a sole.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Various embodiments of the present invention are described in the following detailed description. However, emphasis is placed on the fact that the present invention is not limited to these embodiments. The method described herein may be used for the manufacture of shoe soles in general, such as, for example, for sport shoes, casual shoes, lace-up shoes or boots such as working boots.

It is also to be noted that individual embodiments of the invention are described in greater detail below. However, it is clear to the person skilled in the art that the design possibilities and optional features described in relation to these specific embodiments can be further modified and combined with one another in a different manner within the scope of the present invention and that individual steps or features can also be omitted where they appear to be unnecessary. In order to avoid redundancies, reference is made to the explanations in the previous sections, which also apply to the embodiments of the following detailed description.

FIG. 1 presents a schematic view of an embodiment of a manufacturing apparatus 100 according to the invention for automatically manufacturing shoe soles, for example for a sport shoe. In the following, the operation of the apparatus 100 will be described.

The process starts with loading 107 a transfer plate 105 with at least one outsole element 110 and at least one supporting element 115. In the embodiment of FIG. 1, an exemplary number of six pieces of each element 110 and 115 are loaded onto the transfer plate 105. The geometry for arranging the elements 110 and 115 onto the transfer plate 105 may be selected freely depending on the available space. Moreover, the loading step 107 may be executed manually by workers and/or automatically by machines, e.g. robots.

In the embodiment of FIG. 1, the step of loading 107 the transfer device 105 comprises the step of attaching the outsole elements 110 to a first side of the transfer plate 105, rotating 150 the transfer plate 105 by means of a robot arm 122 and attaching the supporting elements to a second side of the transfer plate 105 opposite to the first side. Thus, the footprint of the apparatus 100 may be reduced as only a single transfer plate 105 is needed for the loading 107 of two types of elements for a plurality of shoe soles to be molded.

In one embodiment (not shown), the transfer may be performed not by the transfer plate 105 but by a more complex transfer object, e.g. a cube with six adjacent sides, in order to increase the number of outsole and/or supporting elements that can be transferred to the sole molds in a single movement.

In one embodiment, the attaching step may further comprise that the transfer plate 105 is adapted to suction the outsole elements 110 and/or the supporting elements 115. Once again, in contrast to a mechanical attachment, a suctioning operation can be largely independent of the variances in product manufacturing tolerances of the individual item and additionally, in the context of shoe manufacture, the difference in dimensions due to the requirement for a range of different shoe sizes. This advantage facilitates the automated production of shoe soles and particularly facilitates manufacture of shoe soles with different sizes.

As a next step, the process includes a step 120 of moving the loaded transfer plate 105 by means of a robotic device 122 into a position between a plurality of first parts of a plurality of sole molds (not shown in FIG. 1) and a plurality of second parts 125 of the sole mold. The first parts and the second parts are described in more detail below with reference to FIGS. 2*a* and 2*b*. While the transfer plate 105 is in the described embodiment moved into a position between the pluralities of first and second parts, it is also conceivable to arrange the first and second parts initially in another configuration, for example side by side, before the transfer of the outsole elements and the supporting elements from the transfer plate to the first and second sole parts takes place. As can be seen in FIG. 1, the schematic robotic device 122 comprises a rotatable arm, which may be moveable also in other directions so as to rotate or move the transfer plate in all three directions in space. In addition, it is also conceivable that the robotic device 122 may comprise other components such as additional arms for example for attaching a plurality of transfer plates 105.

FIG. 1 also illustrates the subsequent step of transferring 127 the plurality of outsole elements 110 from the transfer plate 105 to the first parts (not shown in FIG. 1) of the sole molds and of transferring 127 the plurality of supporting elements 115 to the second parts 125 of the sole molds. For example, the robotic device 122 may move into the middle location in between the two parts. Between the two mold parts the robotic device configuration may be such that the transfer plate 105 moves linearly with respect to the mold surfaces. The transfer plate 105 may then move up to the first parts, which may be fixed and may push the plurality of outsole elements 110 into the cavity. As the robotic device 122 positions the loaded transfer plate 105 with six outsole elements 110 and six supporting elements 115 between the first and second parts of the sole mold, the elements can be transferred at in a short amount of time into the corresponding first and/or second mold parts. Thus, the cycle time of the overall process is significantly reduced.

Figure 2A:
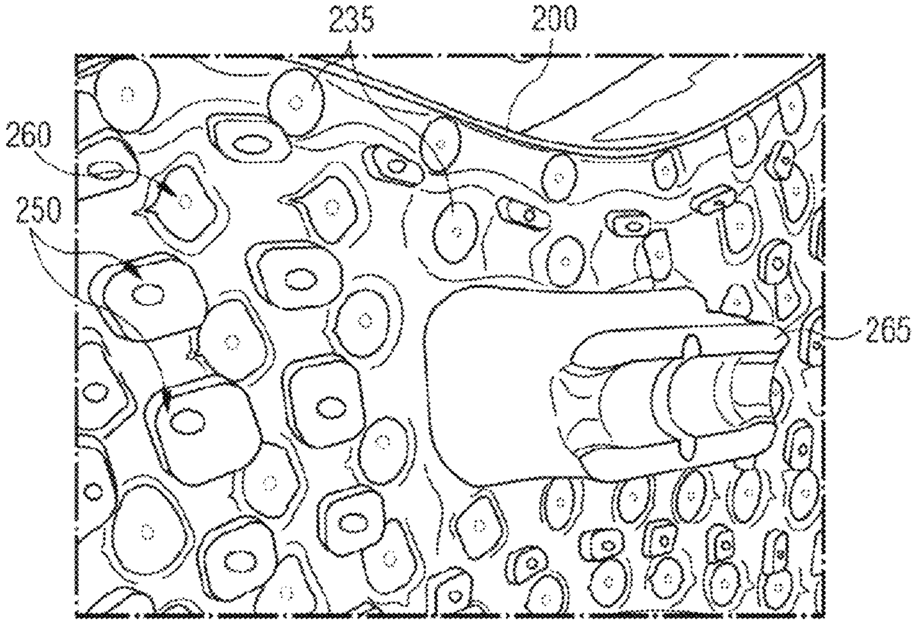
FIG. 2*a* shows a first part of a sole mold for an apparatus for the automated manufacturing of shoe soles according to aspects of the present disclosure.
Figure 2B:
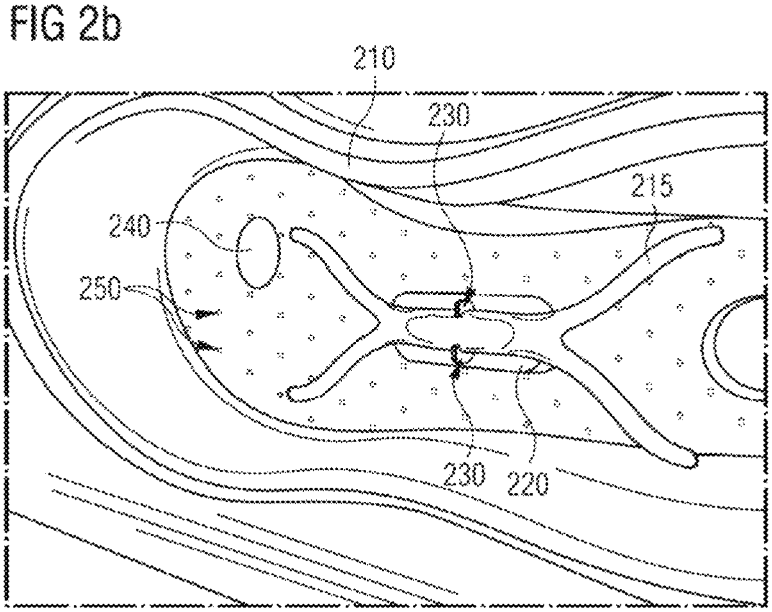
FIG. 2*b* shows a second part of a sole mold for an apparatus for the automated manufacturing of shoe soles according to aspects of the present disclosure.

In the embodiment of FIG. 1, the step of transferring 127 the at least one outsole element 110 further comprises placing the supporting elements 115 in a corresponding plurality of holding elements 160 (FIG. 2*b* shows an example of such a holding element 220 in more detail) provided in the second parts 125 of the molds. The outsole elements 110 may be placed into a plurality of correspondingly shaped recesses 235 (shown in FIG. 2*a*) provided in the first parts of the molds. It is apparent to the skilled person that the arrangement and the function of the first and the second parts of the sole molds could also be exchanged.

The holding elements 160 and recesses 235 allow to securely position the two types of elements for the subsequent molding for each process. As a result, the steps of filling 130 the mold with particles and applying 140 the medium provide a final shoe sole that comprises both, a correctly attached outsole element 110 and a correctly integrated support element 115. As can be seen, the whole process can be performed without any adhesives being involved.

The first and the second parts 125 are movable by a movement 170 to close the sole molds prior to a step 130 of filling each mold with a plurality of individual particles. In other words, the first and the second parts 125 of the sole molds provide a set of six mold cavities into which the individual particles can be filled. Advantageously, any loss of particles is therefore reliably avoided. Alternatively, only one part of the mold may be moveable. In the filling step 130, a high number of the particles may be supplied in a short amount of time so that the production cycle time is further reduced.

Each sole mold may comprise at least one first opening 240 arranged in one or in both parts of the sole mold for supplying the particles. In the embodiment of FIG. 2*b*, the first opening 240 is provided in the second part 210 of the mold. Providing more than one first opening may further accelerate the supply of the particles into the respective mold. In addition or alternatively, it is also conceivable that the first opening 240 could be provided simply by opening a gap between the two parts of the mold and filling the particles through the gap.

In one embodiment, the apparatus 100 may comprise moveable pins for ejecting the molded shoe soles (not shown in the Figures). For example two of such moveable pins may be integrated into the at least one first opening 240, alternatively or additionally two of such moveable pins may be integrated into each holding element 160. In a first position, the pins do not extend beyond the surface of the mold cavity and in a second position the moveable pins may extend out of the at least one first opening 240 or holding element 160 and thus push the manufactured sole out of the sole mold. Alternatively or in addition, other means may be provided to remove the molded sole from the mold such as compressed air or even an automatic gripper employing, for example, electrostatic, sectional or mechanical gripping means. It should be evident that other gripping means known in the state of the art of automatic grippers can also be used.

In one embodiment, the particles may, for example, be made from an expanded material such as expanded thermoplastic polyurethane pellets (eTPU) or expanded polyamide pellets (ePA) or expanded polyetherblockamide pellets (ePEBA). It is also conceivable that any other appropriate material for the purpose of shoe midsole manufacture may be used. Furthermore, the expanded particles may be randomly arranged or with a certain pattern inside the mold.

As schematically shown in FIG. 1, a medium is supplied in a next step 140 by a medium supply 145 to bond and/or fuse the particles with each other and with the at least one outsole element 110. In contrast to the prior art, only a single production step is needed, which replaces an individual attachment of each outsole element 110 after the midsole manufacture. Moreover, the support element 115 can at the same time be automatically integrated into the sole made from the bonded/fused particles. As a result, the overall cycle time and the labor costs are reduced.

While many different types of media are conceivable, such as special chemicals or massless media such as electromagnetic radiation, the embodiment of FIG. 1 uses steam. Steam is inexpensive, easy to handle and provides the necessary temperature for the bonding and/or fusing process of certain types of particles, in particular the above-mentioned particles from expanded thermoplastic polyurethane.

As can be seen in FIG. 2*a*, the first parts 200 comprise at least one recess 235 which may be correspondingly shaped to the at least one outsole element 110. In such an embodiment, the plurality of recesses 235 may be arranged so that they may form essentially the negative of a complete outsole. The outsole elements 110 may be placed by the robotic device 122 in the recesses of the first parts of the mold prior to the molding process with the particles.

The outsole elements 110 may be pre-manufactured, for example, by injection molding, compression molding, thermoforming or any other methods of converting 2D designs to 3D moldings as known to the skilled person in the art. Alternatively, the outsole elements 110 may at least partly be formed or molded in the first part 200 of the mold. For example, a raw strip of outsole material can be positioned in the mold, which is then heated during molding of the particles and only then assumes the final outsole shape and at the same time connects to the molded particles.

In the embodiment in FIG. 2*a*, each first part 200 of the molds comprises at least two second openings 250. The second openings 250 may be arranged adjacent to the recesses 235 to uniformly supply the medium to bond and/or fuse the particles with each other in order to form the midsole, wherein the midsole may be simultaneously connected to the outsole element 110 positioned in the mold.

In the embodiment in FIG. 2*a*, the first part 200 comprises a means 260 for cooling the first part 200 of the mold and/or the outsole elements arranged therein. The means for cooling 260 may be small openings on the surface of the first part 200, which may be connected to channels providing a cooling medium such as cold air or a suitable liquid, for example, water. If the pre-manufactured outsole elements 110 are subjected to higher temperatures during molding the particles, they may start to deform or even melt, so that fine structures of for example the profile of the outsole elements may be distorted or even fully lost. This problem can be avoided or at least reduced by cooling the first part 200 of the sole mold in which the at least one outsole element 110 is placed. Moreover, this may also allow to further shorten the overall cycle time.

In the embodiment in FIG. 2*b*, the second part 210 of the mold comprises a plurality of second openings 250 on the inner surface of the second part. The second openings 250 are arranged in an essentially regular pattern of elongated openings having a smaller length than the average size of the particles. Second openings 250 with such dimensions allow on the one hand the medium such as steam to reach practically all particles of the sole to be molded. On the other hand, individual particles or even a plurality thereof are not left without support in the mold, so that an unintended expansion of such particles into a larger second opening is avoided, which could cause an uneven sole surface. In addition, less or no particles can leave the sole mold through the second openings 250. Moreover, the dense and regular pattern of second openings as shown in FIG. 2*b* may also provide a high quality of the molded particles as essentially the same amount of energy provided by the steam can be absorbed by the particles throughout the sole area.

FIG. 2*b* also shows an exemplary holding element 220 in the midfoot portion of the final sole. As mentioned before, the holding element allows to securely position a supporting element 115 in the second part. In the embodiment of FIG. 2*b*, this is achieved by two static, but somewhat elastic pins 230. The two static pins 230 are formed to match the shape of a central portion of the supporting element 115. It is also possible that only one or more than two pins may be arranged to fix a supporting element at a predetermined position inside the second part of the sole mold. This may depend on the specific shape of the supporting element 115. In any case, no adhesives are needed to integrate the supporting element 115 in the molded particle sole. Alternatively or in addition, the holding element 220 may be arranged in a heel portion and/or forefoot portion of the sole mold depending on the desired performance characteristics for the sole. In addition, it is also possible to provide a plurality of holding elements 220 in order to provide more than one supporting element 215 for the sole to be manufactured and thereby provide specific performance characteristics in certain parts of the sole.

FIG. 2*a* shows that the holding element 220 of the second part of the mold may have a corresponding counterpart 265 in the first part of the mold. This counterpart 265 may contribute to a secure positioning of the supporting element 215, when the mold is closed.

In one embodiment, the first part 200 and/or the second part 210 of the mold may be partly or even completely manufactured by an additive manufacturing method. In a more specific embodiment, the additive manufacturing method may involve laser sintering. However, other additive manufacturing methods such as 3D printing, stereolithography (SLA), selective laser melting (SLM) or direct metal laser sintering (DMLS), selective laser sintering (SLS), fused deposition modeling (FDM), etc. can alternatively or in addition be used to make the two parts 200 and 210.

The first part 200 and/or the second part 210 may comprise stainless steel alloys, stainless hot-work steels, precipitation hardening stainless steels, tool steels, aluminum alloys, titanium alloys, commercially pure titanium, hot-work steels, bronze alloys, nickel based alloys, cobalt based alloys, in particular, cobalt chromium tungsten alloys, copper alloys, precious metal alloys. Alternatively or in addition, any other material or a mixture of at least two materials may be used provided the material(s) have appropriate properties such as durability and/or conductivity Alternatively or in addition, any other material or a mixture of at least two materials may be used provided the material(s) have appropriate properties such as durability and/or conductivity of heat.

Figure 3:
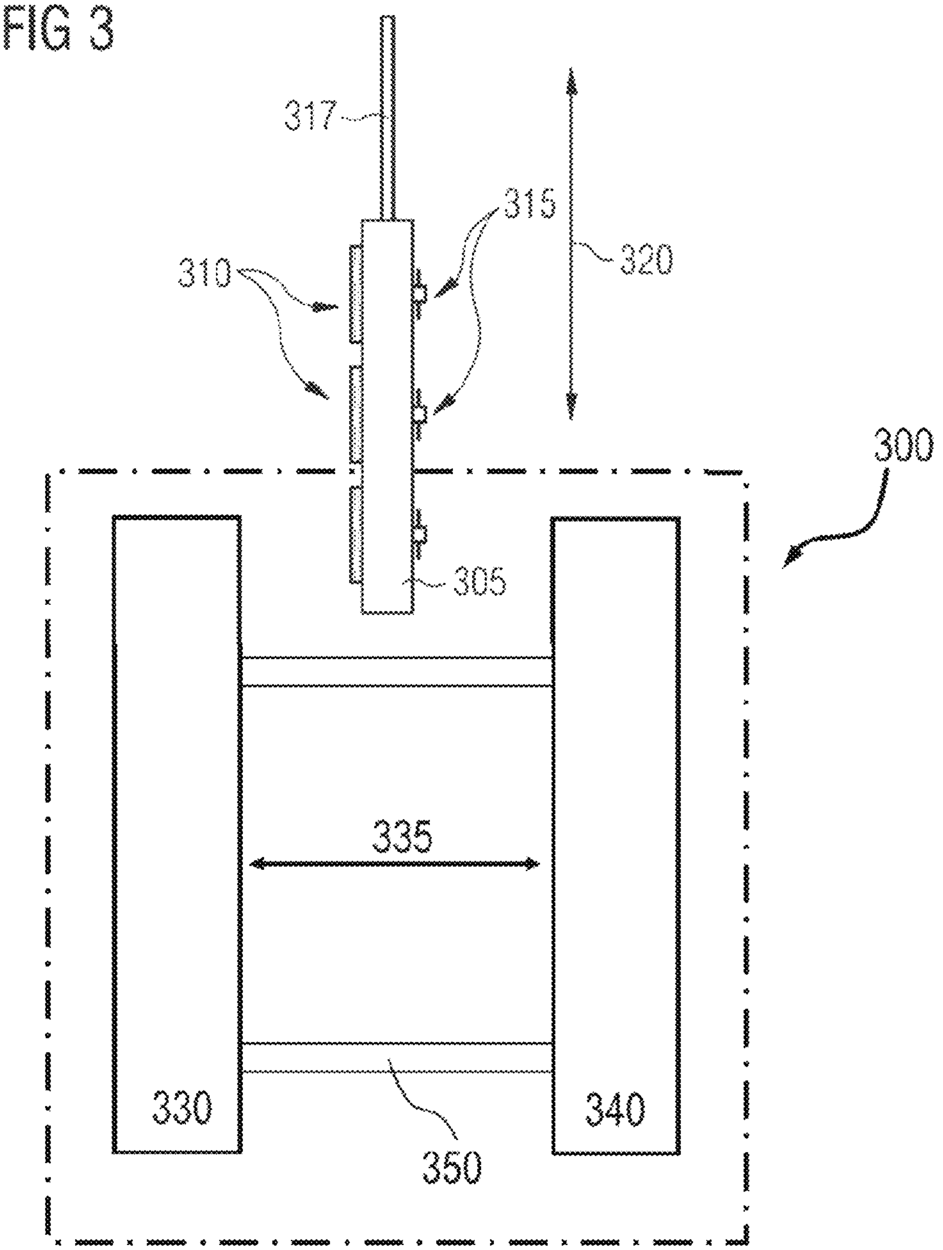
FIG. 3 is a schematic view of an apparatus for the automated manufacturing of shoe soles according to aspects of the present disclosure.

FIG. 3 presents a side view of an apparatus 300 for the automated manufacturing of shoe soles according to the invention. The apparatus 300 may comprise one or more of the above explained features of the embodiment in FIGS. 1 and 2*a*-2*b*.

As can be seen in FIG. 3, the apparatus 300 also comprises a transfer plate 305 loaded with a plurality of outsole elements 310 and a plurality of supporting elements 315 on opposite sides of the transfer device 305. Moreover, the apparatus 300 comprises a robotic device 317 adapted to position in a step 320 the loaded transfer plate 305 between a first carrier 330 for a plurality of first parts of sole molds and a second carrier 340 for a plurality of second parts of sole molds. The first parts on the first carrier 330 and the second parts on the second carrier 340 are moveable in a step 335 by means of a plurality of linear guiding rods 350.

Such an embodiment provides a very reliably and simply way for closing the sole molds. If a larger number of first and seconds parts of the sole molds are attached to the two carriers in order to produce a higher number of shoe soles during each production cycle, the linear guiding rods 350 may provide an increased stability and precision for the overall apparatus 300.

Moreover, a linear closing movement of the two parts 330 and 340 may be performed with comparatively high speed as the at least one guiding rod 350 provides a high amount of directional stability. Again, this allows to reduce the cycle time and to a more efficient manufacturing of shoe soles.

In one embodiment, the apparatus 300 may further comprise a means for curing the formed shoe soles under the influence of heat (not shown). For example, after ejection by means of the above described ejection pins, the molded shoe soles may drop onto a conveyer belt that automatically take the soles to an oven. Here the soles may be cured, for example for several hours at an elevated temperature of more than 60° C., preferably at 70° C. Heat may be provided to said oven by a variety of means, for example, conventional oven heating elements known in the state of the art, high frequency (HF) electromagnetic radiation, radio frequency (RF) radiation, microwave (MW) radiation or different electromagnetic radiation, or electromagnetic fields in general, for supplying heat energy. At the same time the apparatus 300 may continue to run through several additional production cycles—which may be as short as a few seconds—to mold further shoe soles. In other words, providing a separate curing station further increases the productivity of the molding process and the corresponding apparatus.

Figure 4A:
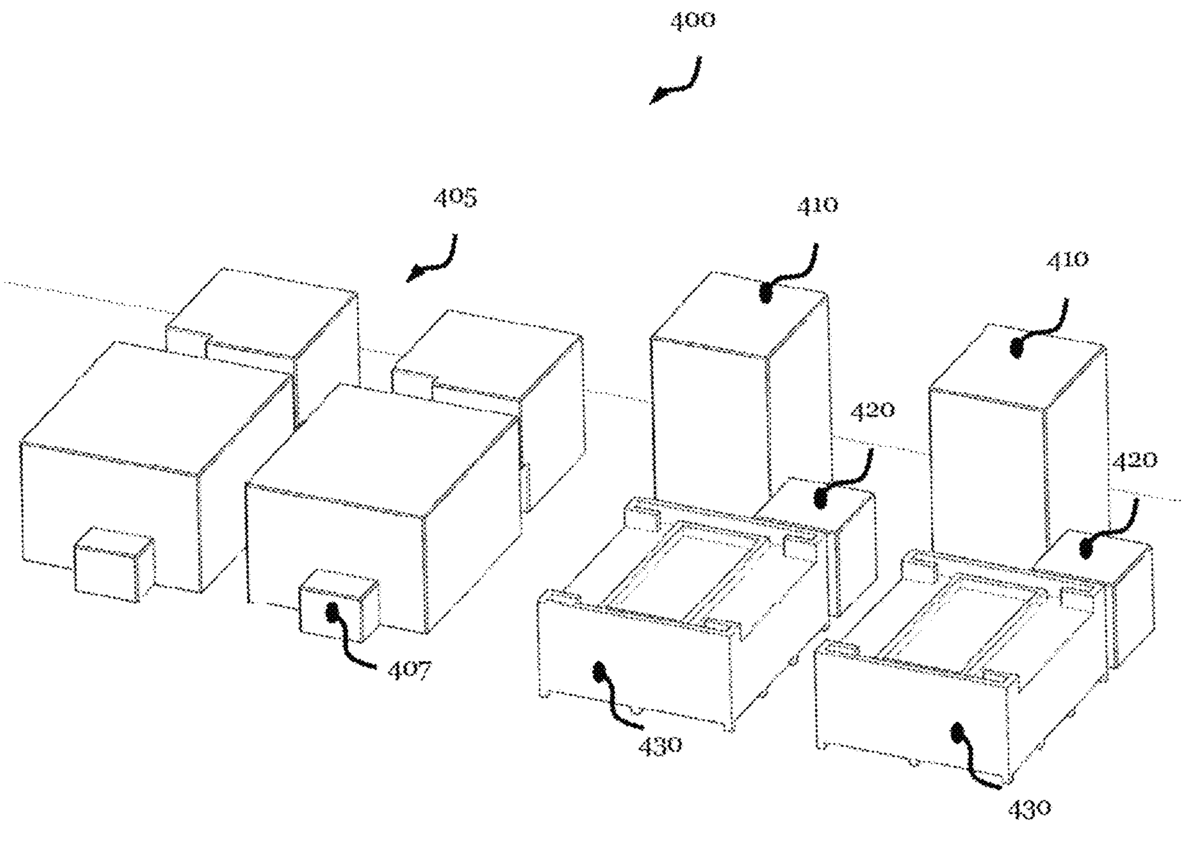
FIG. 4*a* is a schematic of an apparatus for the automated manufacturing of shoe soles according to aspects of the present disclosure.

FIG. 4*a* presents a schematic view of another embodiment of a manufacturing system 400 for automatically manufacturing shoe soles, for example a sport shoe, performing a method as mentioned above and including one or more stations for automatically post processing. The manufacturing system 400 may comprise an apparatus 405 for the automated manufacture of shoe soles based on one or more of the above explained features of the embodiments in FIGS. 1, 2*a*-2*b* and 3.

The manufacturing system 400 may comprise a movable loading table 407 on which at least one outsole element and at least one supporting element may be arranged for the step of loading the transfer device of the apparatus 405, similar to the transfer device 305 of FIG. 3. For example, the movable loading table 407 may be loaded at floor level and then may rise vertically to the height of the transfer device so that the step of loading the transfer device may be performed. Moreover, the movable loading table 407 may be movable in other directions, for example in a horizontal direction. Thus, the manufacturing process may be simplified and the transfer device may be faster loaded so that the cycle time may be reduced.

In one embodiment, the manufacturing system 400 for automatically manufacturing shoe soles may comprise means for releasing (not shown in FIG. 4*a*) a first part of a mold comprising at least one recess as explained above, wherein the at least one recess may be shaped correspondingly to the at least one outsole element. Such means for releasing may be designed to enable quick or fast release to aid interchanging. Additionally, or alternatively, the means for releasing may be designed in such a way to facilitate automated interchanging of the first part of the mold for different shoe sizes so that the overall cycle time for manufacturing a plurality of shoe soles may be reduced.

The manufacturing system 400 may comprise means for automated unloading of the molded shoe soles from the molds. For example, a robotic device using means for gripping, for example, vacuum grippers having plates being larger than the manufactured shoe soles, may remove the molded shoe soles from the molds. The robotic device may slide vertically on a line in front of the molds. Additionally or alternatively, the robotic device may slide vertically and horizontally on a line in front of the molds. Moreover, there may be an end stop or end stops on the line to ensure, that the distance the robotic device can travel, can be controlled.

Moreover, the means for automated unloading of the molded shoe soles from the molds may comprise means for automatically detecting retained components, for example, outsole element or particles, in the molds. For example, a vision system comprising at least one camera may be used, wherein the vision system may comprise means for comparing at least one picture of the mold with at least one reference picture. The at least one reference picture may be provided from a database.

The manufacturing system 400 may comprise means for measuring the weight of the manufactured shoe sole, for example, a small weight scale to directly measure this weight. If the weight is within tolerances, then the manufactured shoe sole may be placed on a conveyer and may be conveyed to a curing station 410, for example, an oven. In this context, measuring the weight of the shoe at an early stage may be useful to give early indications of problems, for example, problems within the foamer for foaming the particles of the midsole.

As can be seen in FIG. 4*a*, the manufacturing system 400 may comprise at least one curing station 410 for curing a plurality of manufactured shoe soles, wherein the plurality of manufactured shoe soles may be placed onto a tray (not shown in FIG. 4*a*). Additionally or alternatively, the tray may comprise a means for tracking, for example, a tracking system code. After the step of curing, the tray may be removed from the at least one curing station 410, for example, by the means for automated unloading the molded shoe soles or another device, and may be placed on another conveyer to be taken to an automated quality check station 420 which will be explained in FIG. 4*b*. Additionally or alternatively, there may be a buffer on the conveyer to store one or more shoe soles, if the automated quality check station 420 is occupied.

After the automated quality check, the finished shoe soles may be stored in at least one storage station 430.

Figure 4B:
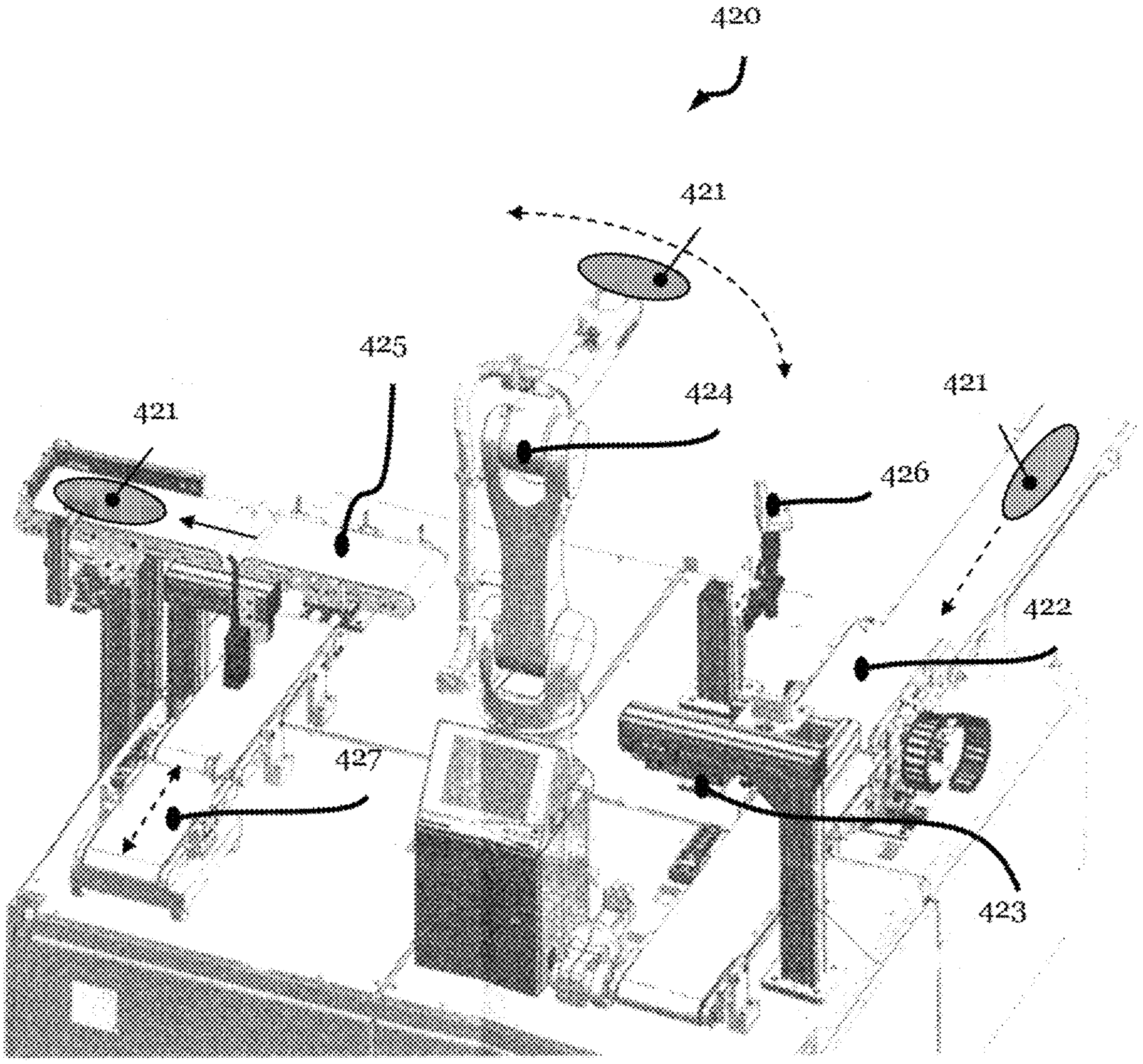
FIG. 4*b* is a schematic of an apparatus for the automated manufacturing of shoe soles according to aspects of the present disclosure

FIG. 4*b* presents a detailed view of an embodiment according to another aspect of the present invention directed to a method for an automated quality check of a manufactured shoe sole.

In one embodiment, the method comprises the steps of (a.) generating a three-dimensional scan of the shoe sole and (b.) comparing the result of the three-dimensional scan with stored design data. The three-dimensional scan and the step of comparing which may be performed automatically by one or more entities may significantly reduce the overall cycle time. This advantage facilitates the automated production of shoe soles.

In some embodiments, the three-dimensional scan may be generated while moving the shoe sole. Additionally or alternatively, the scanner may also be moved around the shoe sole. Both options follow the same idea that the whole shoe sole or component is carefully imaged. Moreover, the method may further comprise the step of taking at least one picture of the non-moving shoe sole. All these options follow the same idea of further significantly reducing the cycle time and reducing labor costs whilst performing the quality check and increasing repeatability, and precision.

Moreover, the step of comparing may be directed to identify physical and visible defects on one or more areas of the shoe sole, for example, unfused or excessively fused particles, dirt or foreign matter in/on the shoe sole etc.

In some embodiments, the method may comprise the step of measuring the weight of the shoe sole and/or measuring at least one key dimension of the shoe sole. Thus, dynamic properties such as cushioning, stiffness or flexing properties of the manufactured shoe sole may also be automatically investigated.

In one embodiment, the method further comprises the step of providing a means for tracking the shoe sole, preferably a quick response, QR, code. Thus, different information about the shoe sole (e.g. material properties, shape, density, melting temperature, etc.) may be obtained by reading the QR code. It is also conceivable that any other code may be used such as UPC code, Micro QR code, Secure QR-code, iQR-Code or Frame QR, etc. or any other means for tracking such as RFID-Tags, transponder, etc.

In some embodiments, the method may further comprise the step of automatically storing the compared shoe sole in a storage station. It should be noted that each step as mentioned herein may be automated or performed automatically. The term "automated" or "automatically" designates a process, which occurs with a reduction in, or a complete removal of, human intervention.

According to another aspect, the present invention is directed to a system for an automated quality check of a manufactured shoe sole performing a method according to one of the preceding embodiments. Moreover, the system for an automated quality check of a manufactured shoe sole may be integrated into a system for automatically manufacturing shoe soles. Furthermore, both systems may be arranged in a common facility. For example, the quality check system may be arranged next to one or more other stations of the system for automatically manufacturing shoe soles in the common facility (which could be a factory but also a reserved space in a retail store). Additionally or alternatively, the system for an automated quality check of a manufactured shoe sole may be arranged in another facility and the checked manufactured shoe soles may be then transported to the facility where the system for automatically manufacturing shoe soles is placed to perform steps of further processing.

Referring now to FIG. 4*b* and as mentioned above, the method for an automated quality check of a manufactured shoe sole comprising randomly arranged particles may be performed by the automated quality check station 420 of the system 400. In the following, the operation of the automated quality check station 420 of the system 400 will be described.

It should be noted that any other arrangement of different parts of the automated quality check station 420 explained in the following is also conceivable. The process starts that the shoe sole 421 enters the automated quality check station 420 via a conveying means.

As a next step, the shoe sole 421 is imaged by an image capture device 423, for example, a camera. The image capture device may take a single image of the shoe sole, for example, a two-dimensional picture. However, it is also possible that the image capture device takes multiple images and furthermore that the at least one image may comprise three-dimensional information, for example, by using at least two cameras to provide contour information of the surface(s).

After taking the at least one image of the shoe sole 421, a robot device 424, equipped with gripping means, for example, needle grippers, picks up the shoe sole 421 to move the shoe sole to a further scanning area. The shoe sole may be moved directly to the scanning area by the robot or the robot may place the shoe sole onto an intermediate transport means, for example, conveying means 425 such as a conveyor belt. A three-dimensional scan is generated by a scanning unit 426. This may be done while the shoe sole 421 is static or when the shoe sole is moved over the scanning area.

In one embodiment, the scanning unit 426 may also comprise an image capture device (similar to the picture capture device 423) and a laser scanner. Other means for generating three-dimensional scans of the shoe sole 421 known in the prior art may be also used.

The scanning unit 426 images the shoe sole in order to provide a visual and physical check of the product. For this purpose, the result of the three-dimensional scan is compared with stored design data. For example, the stored design data may comprise a basic picture standard stored as a preset within the automated quality check station 420. This basic picture standard is compared with the three-dimensional scan and/or with the at least one picture from the surface(s) of the shoe sole 421 to provide an opinion of the quality of the shoe sole 421 to check if the shoe sole 421 is faulty or not. Additionally or alternatively, the automated quality check station 420 may comprise a machine learning unit (not shown) so that the station 420 may learn and improve its basic picture standards. Therefore, the step of comparing may be improved. The machine learning unit may use self-learning algorithms and models or may use the confirmation/declination of the opinion of the surface(s) by an external expert to state whether the shoe sole 421 is or is not acceptable.

As a next step, the shoe sole may be directly moved to the scanning area by the robot 424 or the robot 424 may place the shoe sole onto an intermediate transport means, for example, conveying means 425 such as a conveyor belt for transporting the shoe sole to the scale and a balance unit 427 to measure the weight of the shoe sole 421 and/or at least one key dimension of the shoe sole, for example, the length of the shoe sole 421.

In one embodiment, a means for tracking the shoe sole 421, for example, a QR code as mentioned above, may be provided on the shoe sole 421. For example, the information of the QR code may be created once the shoe sole 421 has been arranged within the foamer for foaming the particles of the midsole so that this information may identify the shoe sole 421 in the automated quality check station 420 and in the whole manufacturing system 400.

The shoe sole 421 may be automatically stored in the storage station 430. It is possible that the quality check station 420 ends in the storage unit. Furthermore, it is also possible that the shoe soles may be directly moved to the storage area 430 by a robot or the shoe soles are transported to the storage unit 430 by an intermediate transport means, for example, conveying means 425 such as a conveyor belt. The shoe sole 421 may then be stored according to the information of the QR code.

In one embodiment, the at least one storage station 430 may comprise a plurality of storage boxes (not shown) comprising an electronic means, for example, RFID chips, to store the details of the shoe sole 421. Each storage box may be equipped with two shoe soles 421 corresponding to a finished pair of shoes. The storage boxes may slide out of the storage station 430 to be taken and stored elsewhere or in another storage box 430. Moreover, the means for tracking may be used to derive information during further processing steps or stages, for example, customization.

In the following, further embodiments are described to facilitate the understanding of the invention:

1. Method for automated manufacturing of shoe soles comprising the steps of:
   a. loading a transfer device with at least one outsole element and at least one supporting element;
   b. positioning the loaded transfer device adjacent a first part and a second part of a sole mold;
   c. transferring the at least one outsole element from the transfer device to the first part and transferring the at least one supporting element from the transfer device to the second part of the sole mold;

d. filling the sole mold with a plurality of individual particles; and e. applying a medium to bond and/or fuse the particles with each other and with the at least one outsole element.

2. Method according to embodiment 1, wherein the transfer device is in step b. positioned between a first part and a second part of a sole mold.

3. Method according to the preceding embodiments 1 or 2, wherein the step of loading the transfer device comprises the steps of: attaching the at least one outsole element to a first side of a transfer device; rotating the transfer device; and attaching the at least one supporting element to a second side of the transfer device opposite to the first side.

4. Method according to the preceding embodiment 3, wherein the steps of attaching comprises suctioning the at least one outsole element and/or the at least one supporting element.

5. Method according to one of the preceding embodiments 1-4, wherein the step of transferring the at least one outsole element comprises placing the at least one outsole element into at least one correspondingly shaped recess provided in the first part of the mold.

6. Method according to one of the preceding embodiments 1-5, wherein the step of transferring the at least one supporting element comprises placing the at least one supporting element in a holding element provided in the second part of the mold.

7. Method according to one of the preceding embodiments 1-6, further comprising the step of ejecting the molded shoe sole from the mold by means of ejecting devices integrated into the holding element for the supporting element.

8. Method according to one of the preceding embodiments 1-7, wherein the first part and/or the second part are moved to close the mold prior to the step of filling the sole mold with a plurality of individual particles.

9. Method according to one of the preceding embodiments 1-8, further comprising the step of cooling the first part of sole mold when and/or after applying the medium.

10. Method according to one of the preceding embodiments 1-9, further comprising the steps of: removing the formed shoe soles; and curing the formed shoe soles under the influence of heat.

11. Method according to one of the preceding embodiments 1-10, wherein the medium comprises steam.

12. Apparatus for automated manufacturing of shoe soles, comprising:

a. a transfer device adapted to be loaded with at least one outsole element and at least one supporting element;

b. a robotic device adapted to position the loaded transfer device adjacent a first part and a second part of a sole mold;

c. wherein the robotic device is further adapted to transfer the at least one outsole element from the transfer device to the first part and adapted to transfer the at least one supporting element from the transfer device to the second part of the sole mold;

d. a particle supply adapted to fill the sole mold with a plurality of individual particles; and e. a medium supply, the medium being adapted to bond and/or fuse the particles with each other and with the at least one outsole element.

13. Apparatus according to the preceding embodiment 12, wherein the robotic device is adapted to position the loaded transfer device between the first and the second part of the sole mold.

14. Apparatus according to embodiment 12 or 13, wherein the transfer device is adapted to be loaded with the at least one outsole element and the at least one supporting element on opposite sides of the transfer device.

15. Apparatus according to one of the preceding embodiments 12-14, wherein the transfer device is adapted to suction the at least one outsole element and/or the at least one supporting element.

16. Apparatus according to one of the preceding embodiments 12-15, wherein the robotic device is adapted to place the at least one outsole element into at least one correspondingly shaped recess provided in the first part of the mold.

17. Apparatus according to one of the preceding embodiments 12-16, wherein the robotic device is adapted to place the at least one supporting element in a holding element provided in the second part of the mold.

18. Apparatus according to one of the preceding embodiments 12-17, further comprising a first part and a second part of the sole mold, wherein means for ejecting the molded shoe soles are integrated into the holding element of the second part.

19. Apparatus according to one of the preceding embodiments 12-18, wherein the first part and/or the second part are movable to close the mold prior to filling the sole mold with a plurality of individual particles.

20. Apparatus according to embodiment 19, wherein the first and/or the second part are moveable by means of at least one linear guiding rod.

21. Apparatus according to one of the preceding embodiments 12-20, further comprising a means for cooling the first part of sole mold.

22. Apparatus according to one of the preceding embodiments 12-21, further comprising a means for curing the formed shoe soles under the influence of heat after removal from the sole mold.

23. Apparatus according to one of the preceding embodiments 12-22, wherein the medium supply is adapted to supply steam.

24. Sole manufactured with a method according to one of the preceding embodiments 1-11.

25. Shoe comprising a shoe sole according to embodiment 24.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A method for an automated quality check of a manufactured shoe sole, the method comprising the steps of:

generating a three-dimensional scan of the shoe sole; and comparing the result of the three-dimensional scan with stored design data;

wherein the step of comparing comprises a step of identifying physical and visible defects on one or more areas of the shoe sole.

2. The method according claim 1, wherein the three-dimensional scan is generated while moving the shoe sole.

3. The method according to claim 1, wherein a scanning unit is moved around the shoe sole to generate the three-dimensional scan of a shoe.

4. The method according to claim 1, further comprising the step of taking at least one picture of a non-moving shoe sole.

5. The method according to claim 1, wherein the stored design data comprises a basic picture standard.

6. The method according to claim 1, further comprising the step of measuring a weight of the shoe sole.

7. The method according to claim 1, further comprising the step of measuring at least one key dimension of the shoe sole.

8. The method according to claim 1, further comprising the step of providing a means for tracking the shoe sole.

9. The method according to claim 1, further comprising the step of providing a QR code.

10. The method according to claim 1, further comprising the step of automatically storing the compared shoe sole in a storage station.

11. A system for an automated quality check of a manufactured shoe sole performing a method according to claim 1, the system comprising a scanning unit configured to generate the three-dimensional scan of the shoe sole.

12. The system according to claim 11, wherein the scanning unit comprises an image capture device and a laser scanner.

13. The system according to claim 11, wherein the system is integrated into a system for automatically manufacturing shoe soles.

14. The system according to claim 13, wherein the system for the automated quality check and the system for automatically manufacturing shoe soles are arranged in a common facility.

15. The system according to claim 11, further comprising a scale and a balance unit configured to measure the weight of the shoe sole.

16. The system according to claim 11, further comprising a scale and a balance unit configured to measure at least one key dimension of the shoe sole.

17. The system according to claim 11, further comprising a storage station.

18. The system according to claim 11, wherein the system further comprises a robot device configured to pick up and transfer the shoe sole to a further scanning area.

19. The system according to claim 12, wherein the scanning unit comprises two or more image capture devices.

20. The system according to claim 13, wherein the system for the automated quality check and the system for automatically manufacturing shoe soles are arranged in separate facilities.

* * * * *